UNITED STATES PATENT OFFICE.

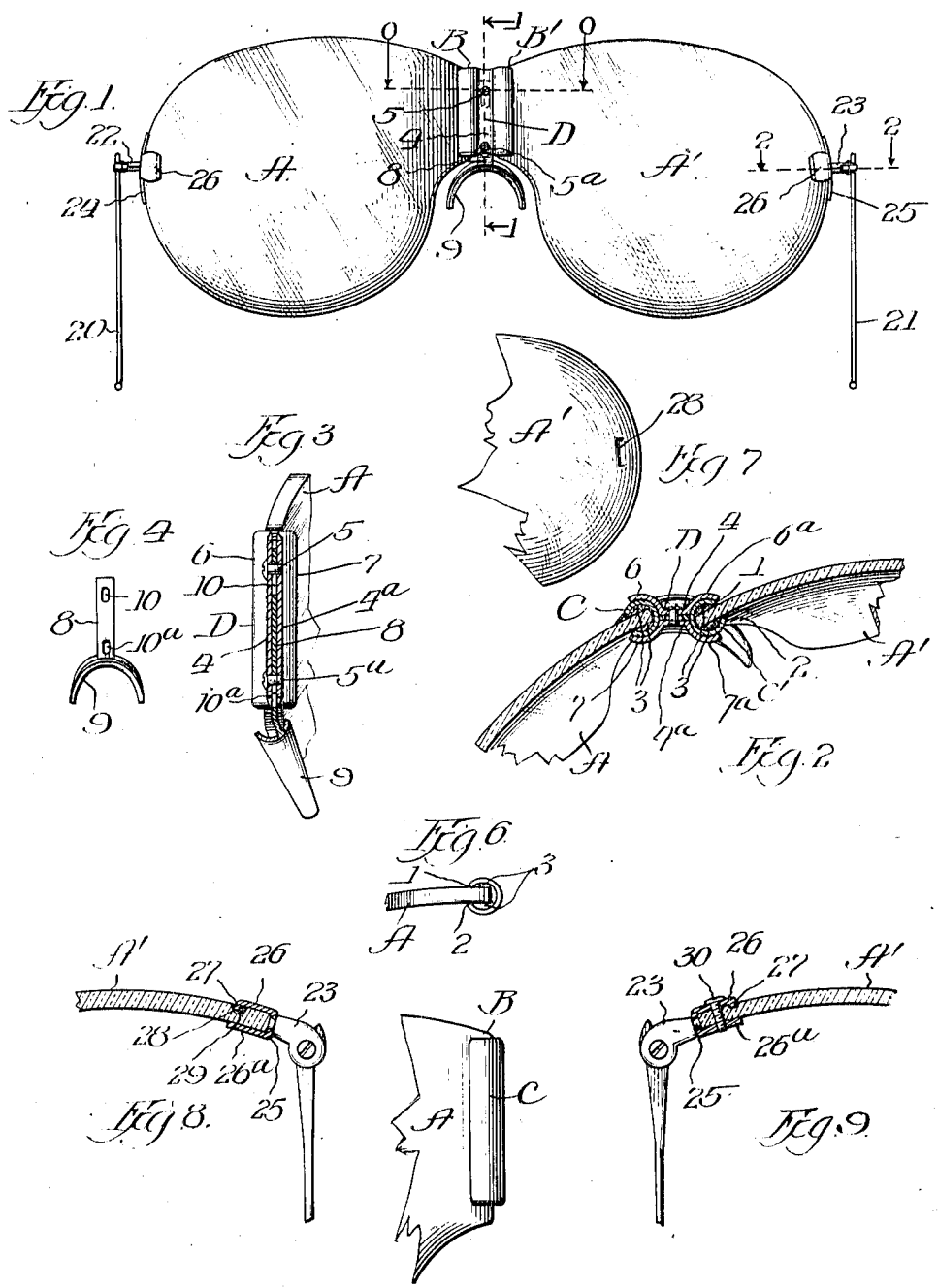

CHARLES F. SPERY, OF CHICAGO, ILLINOIS.

SPECTACLES.

1,099,404.  Specification of Letters Patent.  Patented June 9, 1914.

Application filed May 26, 1913. Serial No. 770,011.

*To all whom it may concern:*

Be it known that I, CHARLES F. SPERY, a citizen of the United States, and a resident of the city of Chicago, in the county of Cook and State of Illinois, have invented a certain new and useful Improvement in Spectacles; and I do hereby declare that the following description of my said invention, taken in connection with the accompanying sheet of drawings, forms a full, clear, and exact specification, which will enable others skilled in the art to which it appertains to make and use the same.

My invention relates generally to improvements in spectacles, and it consists, essentially, in the novel and peculiar combination of parts and details of construction, as hereinafter first fully set forth and described and then pointed out in the claims.

In the drawings already referred to, which serve to illustrate my said invention more fully, Figure 1 is an elevation of my spectacles. Fig. 2 is a longitudinally horizontal section of a fragment thereof on an enlarged scale in line 0 0 of Fig. 1. Fig. 3 is a vertical section on an enlarged scale in line 1—1 of Fig. 1. Fig. 4 is a side elevation of the nose piece employed in my invention. Fig. 5 is an elevation of a fragment of one of the lenses, showing the details of construction, said figure being on a considerably enlarged scale. Fig. 6 is a plan or edge view of Fig. 5. Fig. 7 is another fractional elevation of one of the lenses showing other constructional details. Fig. 8 is an enlarged section of a fragment in line 2—2 of Fig. 1, and Fig. 9 a similar section of a slightly modified type of construction.

Like parts are designated by corresponding characters and symbols of reference in all the figures of the drawing.

Spectacles for use by automobilists, shooters, either trap, target or field, travelers and the like are at present generally manufactured in quantity in certain arbitrary sizes and definitely fixed facial adjustment. As a result, in very many cases the employment of such spectacles results in not only a muscular facial, but also a considerable eye strain to the wearers thereof.

The essence of my invention resides in the provision of universal means applied to spectacles of this class whereby not only the nose piece may properly be adjusted to the individual wearer, but one in which the facial angles of each of the lenses may be adjusted independently of the other, whereby a spectacle of universal adjustment in the true sense of the word is produced. And while my invention is more generally intended for spectacles of the class above described, the same may be applied to all classes of spectacles, eye glasses or pince-nez.

Another feature of my invention is the adoption of devices and means whereby it becomes unnecessary to drill or otherwise produce apertures through the lenses for the attachment thereto of the various metallic parts employed in connection therewith.

To better understand my invention I now refer to the drawings, in which A and A' are the lenses of proper contour and curvature to adapt the same for the purpose intended. Over the inner perpendicular edges B, B' of these lenses are slipped thin, sheet metallic, slotted cylindrical members C and C', as clearly shown in Figs. 2, 5, and 6. These members may be made from thin, rolled gold, platinum, silver, German silver or like material, and when formed into cylindrical shape, the opposite longitudinal edges 1 and 2 thereof are spaced closer together than the thickness of the lenses, so that when these cylindrical members are snapped over the vertical edges B and B' of the lenses, they tightly pinch the same. In addition to this there is introduced into the space between the inner walls of the members C and C' and the surrounding included surfaces of the edges B and B' a cementitious liquid, whereby the cylindrical members C and C' are securely cemented to the lenses A, A'; thereby producing vertical trunnions for said lenses, permitting the same to be oscillated within certain limits.

The trunnion members C and C' are maintained in parallel relationship to each other by a bridge D. This bridge is composed of a pair of essentially rectanguar plates 4 and 4ª, which plates are maintained in parallel relationship by screws 5 and 5ª. The vertical edges of these plates are bowed outwardly on a quarter circle in opposite directions as at 6 and 7 and 6ª and 7ª to form embracements for the trunnion members C and C' of the lenses A and A'. It will thus be observed that by having the screws 5 and 5ª slightly eased off, the lenses A and A' may independently be adjusted to the proper facial angle of the wearer, after which they may be tightly retained in proper position by tightening up of the screws 5 and 5ª.

Located between the plates 4 and 4ª, medially between the bowed portions 6 and 7 and 6ª and 7ª, there is a stem 8 of a nose piece 9, which nose piece may be of any typical construction. Said stem 8 has longitudinal slots 10 and 10ª, through which the screws 5 and 5ª are adapted to pass, and the thickness of this nose piece stem 8 is such that when the plates 4 and 4ª are drawn together by the screws 5 and 5ª to tightly grip the trunnion members C and C' of the lenses A and A', the said nose piece stem is also firmly gripped between said plates and prevented from vertical movement. The ease of the adjustment of this structure to the face of the wearer is now easily understood. First of all the screws 5 and 5ª are eased slightly to render all parts capable of adjustment, while yet maintaining a certain frictional contact. The nose piece 9 is first properly adjusted, which is made permissible by the slots 10 and 10ª in the stem 8 thereof, and the lenses A and A' are then oscillated to the proper facial angle; all this being done while the spectacles are in position upon the wearer thereof. After the several correlated elements are in the desired relationship, all that is necessary is to tighten the screws 5 and 5ª when it will be found that the parts of the spectacles as a whole are maintained rigidly in their proper relative positions.

The spectacles may be equipped with typical temples 20 and 21, which temples are maintained in temple swivels 22 and 23, and these in turn, are swiveled in clips 24 and 25. Each of these clips is possessed of a U-shaped portion having parallel legs 26 and 26ª extending over and tightly embracing the outer edges of the lenses A and A'. The first indicated of each of said legs is formed with a downwardly projecting lip 27, which lip snaps into a depression 28, Figs. 7 and 8, produced in the face of each of the lenses A and A'. This depression is made slightly larger than the projecting lip 27, and the remaining space therein is filled with a cementitious liquid 29 which firmly cements the clips to their respective lenses. If desired a screw 30, Fig. 9, may be passed through legs 26 and 26ª and 27 and 27ª and the lenses A and A' as an additional binder, though this is not necessary, as the cementitious material in connection with the natural spring of the clip and the projecting lip 27 are ample to firmly fasten the parts to the lenses.

While herein I have disclosed the preferred mode of practising my invention, I may resort to changes in detail, all within the scope of the skilled mechanic and within the natural equivalents of said invention.

It may now be observed that my entire device may be manufactured and assembled without being compelled to puncture the lenses in any way; a fact, the importance of which will be appreciated by those skilled in the art.

Having thus fully described my invention I claim as new and desire to secure to myself by Letters Patent of the United States:

1. Spectacles comprising a pair of lenses having trunnions formed along their inner adjacent edges, a bridge connecting said lenses and embracing said trunnions, a stem entering said bridge and adjustable therein, a nose piece at the lower end of said stem, a pair of temples attached to said lenses, and means for frictionally maintaining all of said parts in placed relationship.

2. Spectacles having a pair of lenses possessed of trunnions along their inner adjacent edges, a two part bridge connecting said lenses and embracing said trunnions, a stem passing between the said bridge parts and adjustable therein, a nose piece at the lower end of said stem and means on said bridge adapted to secure all of said parts in positive relationship.

3. Spectacles comprising a bridge, lenses attached thereto on either side thereof, a stem adjustably mounted in said bridge, a nose piece at the lower end of said stem, and means on said bridge to frictionally maintain all of said parts in fixed relationship.

4. Spectacles and the like comprising a pair of lenses and a bridge therebetween, said lenses being in adjustable connection with said bridge, a nose piece in adjustable relationship with said bridge, and means for frictionally maintaining all of said parts in placed relationship.

5. Spectacles and the like comprising a pair of lenses and a bridge therebetween, said lenses being capable of angular adjustment with respect to the plane of said bridge, a nose piece in adjustable relationship with said bridge, and means for frictionally maintaining all of said parts in placed relationship.

6. Spectacles and the like comprising a pair of lenses and a bridge therebetween, a nose piece depending from said bridge, said lenses and nose piece being capable of adjustment to the wearer thereof, and means whereby the said parts may be frictionally maintained in placed relationship.

7. Spectacles and the like comprising a pair of lenses and a bridge therebetween, a nose piece independent of but depending from said bridge, each of said lenses and said nose piece being capable of independent adjustment to the wearer thereof, and means on said bridge to simultaneously fix said lenses and nose piece in the placed adjustment.

8. Spectacles and the like comprising a pair of lenses and a bridge therebetween, a nose piece depending from said bridge, said lenses and said nose piece being capable of adjustment to the wearer thereof and means on said bridge to frictionally maintain said parts in the placed relationship, said means being capable of being eased off to change any of said adjustments.

In testimony whereof I have hereunto set my hand in the presence of two subscribing witnesses.

CHARLES F. SPERY.

In the presence of—
WILLIAM O. STARK,
LAWRENCE WILSON, Jr.